United States Patent
Lessard

(10) Patent No.: US 6,923,596 B2
(45) Date of Patent: Aug. 2, 2005

(54) METHOD FOR THE REMEDIATION OF CONTAMINATED SOIL AND/OR GROUNDWATER VIA INTEGRATED CHEMICAL AND BIOLOGICAL TREATMENT

(75) Inventor: Lawrence H. Lessard, Marblehead, MA (US)

(73) Assignee: Lessard Environmental, Inc., Danvers, MA (US)

( * ) Notice: Subject to any disclaimer, the term of this patent is extended or adjusted under 35 U.S.C. 154(b) by 10 days.

(21) Appl. No.: 10/677,845

(22) Filed: Oct. 2, 2003

(65) Prior Publication Data

US 2004/0067106 A1 Apr. 8, 2004

Related U.S. Application Data

(60) Provisional application No. 60/415,353, filed on Oct. 2, 2002.

(51) Int. Cl.[7] .................................................. B09B 1/00
(52) U.S. Cl. ............................. 405/128.5; 405/128.75; 210/747; 210/601; 435/262.5
(58) Field of Search ........................ 405/128.1, 128.45, 405/128.5, 128.7, 128.75; 210/747, 759, 601, 742; 435/262.5

(56) References Cited

U.S. PATENT DOCUMENTS

| | | | |
|---|---|---|---|
| 4,591,443 A | 5/1986 | Brown et al. | |
| 5,384,048 A | * 1/1995 | Hazen et al. | ............ 405/128.5 |
| 5,525,008 A | 6/1996 | Wilson | |
| 5,578,210 A | * 11/1996 | Klecka | .................... 435/262.5 |
| 5,611,642 A | 3/1997 | Wilson | |
| 5,741,427 A | 4/1998 | Watts et al. | |
| 5,967,230 A | 10/1999 | Cooper et al. | |
| 6,160,194 A | 12/2000 | Pignatello | |
| 6,206,098 B1 | 3/2001 | Cooper et al. | |
| 6,502,633 B2 | 1/2003 | Cooper et al. | |
| 6,623,211 B2 | 9/2003 | Kukor et al. | |
| 6,805,798 B2 | * 10/2004 | Kerfoot | ...................... 210/759 |

FOREIGN PATENT DOCUMENTS

| | | | |
|---|---|---|---|
| WO | WO-98/25857 | 6/1998 | |
| WO | WO-98/35768 | 8/1998 | |
| WO | WO 2004/030840 | * 4/2004 | |

* cited by examiner

*Primary Examiner*—John Kreck
(74) *Attorney, Agent, or Firm*—Michael J. Brown

(57) ABSTRACT

The invention provides repeated sequential stages of chemical and biological treatment to meet soil and/or groundwater treatment goals. Chemical treatment is undertaken to directly destroy a portion of the contaminants via oxidation, with such chemical treatment occurring in discrete injection events. Near the completion of an injection event, the remedial additive concentrations or delivery rates are increased. During or subsequent to the chemical treatment event, beneficial nutrients and additional microbial populations are added to the soil and or groundwater based upon field or laboratory testing and calculated optimal concentrations.

15 Claims, No Drawings

METHOD FOR THE REMEDIATION OF CONTAMINATED SOIL AND/OR GROUNDWATER VIA INTEGRATED CHEMICAL AND BIOLOGICAL TREATMENT

This application claims priority from U.S. provisional patent application Ser. No. 60/415,353, filed Oct. 2, 2002.

FIELD OF INVENTION

The present invention relates to the treatment of contaminated soil and groundwater through a combination of chemical and biological treatments.

BACKGROUND OF INVENTION

Contamination of soil and groundwater by various compounds including both organic and inorganic chemicals is widespread. This contamination threatens human health, public safety, public welfare and the environment. Attempts to remediate contaminated soil and/or groundwater by a variety of means are common.

Two of the existing methods of remediation of contaminated soil and/or groundwater are chemical treatment and biological treatment. Typically, chemical treatment consists of oxidation of the contaminants via application of remedial additives such as hydrogen peroxide, Fenton's Reagent, ozone, sodium or potassium permanganate or bisulfate. Typically biological treatment consists of stimulating microorganisms that are either naturally occurring at or near the treatment location or introducing cultured microorganisms into the treatment area.

There are disadvantages to the common methods of chemical oxidation. The prior art of chemical oxidation frequently relies of the use of strong acids and metallic salts (such as ferrous sulfate) to enhance the chemical reaction. The use of these compounds can be dangerous and costly, and can cause new soil and groundwater contaminant conditions. Chemical treatment, particularly oxidation of contaminants with remedial additives, has been shown to have a detrimental effect on the abundance of microorganisms. These negative effects are primarily due to changes in pH levels and the inherent sterilizing qualities of the materials and methods used in the injections. Table 1 shows the dramatic reduction in the abundance of certain known types of microorganisms as a result of a typical chemical oxidation treatment. In this example case, iron catalyzed hydrogen peroxide was injected into wells to treat soil and groundwater contaminated with gasoline. This treatment method reduces or eliminates the beneficial remedial effect that microorganisms have on the treatment of soil and groundwater. As a result, completion of the treatment process must rely solely on the chemical process.

The prior art of chemical treatment typically relies on the use of strong oxidants so that the chemical treatment works as quickly as possible. As a result of the prior art's bias towards strong oxidants, which are also typically strong sterilizing agents, biological treatment and chemical treatment have not previously been integrated. Those of ordinary skill in the art typically hold the view that integration of oxidants and biological treatment is counter-intuitive. The subject invention offers improvements over the prior art of chemical oxidation by modification of the oxidation process so that it can be effectively integrated with biological treatment.

Biological treatment relies on soil and groundwater conditions being optimized so that naturally occurring or artificially introduced microorganisms can consume the soil and groundwater contaminants. The biological treatment process is slow because of various factors. Competition between the various known types of microorganisms present at the treatment site limits the rate of biological remediation. Large and small-scale variation in the contaminants and the biologically necessary nutrients and electron receptors can affect the efficacy of the treatment. It is a challenge in biological treatment to collocate the remedial additives with the contaminants so that biological activity occurs in the area targeted for remediation. Contaminants are also frequently adsorbed on soil grains, providing little available surface area for the microorganisms to access. Biological treatment is also limited by the temperature of the soil and groundwater with lower temperatures typically resulting is slower biological treatment. As a rule of thumb, microbial respiration rates, which are related to remediation rates, will double with each 10 degree Celsius increase in temperature. The subject invention offers improvements over the prior art of biological treatment by collocating the remedial additives with the contaminants, desorbing the contaminants from soil into groundwater, and increasing the subsurface temperature.

TABLE 1

Detrimental Impact of Chemical Oxidation on Microbial Abundance in Groundwater

| Monitoring Well | Pre-treatment Microbial Abundance | Post-treatment Microbial Abundance |
| --- | --- | --- |
| Well 1 | 18,000 | 165 |
| Well 2 | 160,000 | 49,000 |

Note:
Units of Microbial Abundance are Colony Forming Units per milliliter (CFU/mL) as measured by heterotrophic plate count.

It is the object of the present invention to provide an improved method for soil and/or groundwater treatment.

It is another object of the present invention to overcome the shortcomings and inefficiencies of prior art chemical treatment methods for soil and/or groundwater contamination.

It is another object of the present invention to overcome the shortcomings and inefficiencies of prior art biological treatment methods for soil and/or groundwater contamination.

It is yet another objective of the present invention to provide an improved, cost efficient soil and/ or groundwater remediation process which integrates both chemical and biological treatment.

SUMMARY OF THE INVENTION

The invention is a novel method for the remediation of contaminated soil and ground water through the use of both chemical and biological treatment steps, which selectively enhance the growth of microorganisms that further treat the contaminated soil and groundwater. The method of the invention uses stages of chemical and biological treatment repeated sequentially until soil and/or groundwater treatment goals are met. Initially, chemical treatment is undertaken to directly destroy a portion of the contaminants via oxidation, with such chemical treatment occurring in discrete injection events. Near the completion of an injection event, the remedial additive concentrations or delivery rates are increased. During or subsequent to the chemical treatment event, beneficial nutrients and additional microbial populations are added to the soil and or groundwater based upon field or laboratory testing and calculated optimal concentrations. As a result of this process the overall efficiency of the treatment process is improved as compared to either chemical or biological treatment alone.

DESCRIPTION OF THE PREFERRED EMBODIMENT

The present invention relates to an improved method of soil and/groundwater treatment via integration of the beneficial aspects of both chemical and biological treatment. The method of the invention uses one or more couplets of chemical and biological treatment repeated step-wise until soil and/or groundwater treatment goals are met. Initially, chemical treatment is undertaken to directly destroy a portion of the contaminants via oxidation in a manner similar to prior art. The chemical treatment occurs in discrete injection events. As an injection event is nearing completion, the remedial additive concentrations and/or delivery rate are increased. The rate of the chemical reaction increases and, as a result, several changes in treatment area occur, including, but not limited to: (a) a reduction in the efficiency of the contaminant destruction via chemical treatment, resulting in the generation of excess oxygen which is beneficial to certain known types of microorganisms; (b) an overall decrease in the microbial population in soil and/or groundwater, with those microorganisms best suited to the post-chemical treatment environment surviving; (c) a change in the oxidation-reduction state of various non-oxygen electron acceptors utilized by certain known types of microorganisms during respiration; (d) an increase in the soil and/or groundwater temperature; and (e) the desorption of contaminants from soil into groundwater. During or subsequent to the chemical treatment event, beneficial nutrients are added to the soil and or groundwater based upon field and/or laboratory testing and calculated optimal concentrations. In some cases, bacteria cultured to enhance the biological treatment are added at or near the treatment area.

The microorganisms that are selected via survival of the chemical treatment methodology or subsequently introduced microorganisms are provided a beneficial environment as a result of the novel chemical treatment approach. The desorbed contaminants are more accessible to the microbes because of increased mobility and increased surface area. The desorbed contaminants typically exist in small globules or as an emulsion in groundwater. Surface area in the desorbed state is greatly increased over the adsorbed state. The increased concentrations of oxygen and other oxidized terminal electron acceptors provide a basis for microbial respiration. Increased soil and/or groundwater temperature increases the growth rate and reproduction of the selected microorganisms.

A period of time is provided so that the beneficial microorganisms can treat contaminated soil and/or groundwater. This treatment increases the cost efficiency of the process as compared to chemical treatment alone. The impact of the modified chemical treatment approach is a much more time efficient biological treatment than would otherwise be possible. Subsequent to the biological treatment period, the soil and/or groundwater contaminant concentrations are compared to treatment goals. If necessary, the process is repeated.

The steps of method are detailed below:

1. Install vertical or horizontal injection points as wells or 'French Drains' based on site-specific conditions. Injection points should be located to cover the contaminated zone based upon the distribution of contaminants and a calculated (via pilot test using same procedures outlined here) or estimated area of treatment per injection point. Injection points will typically be spaced 10 to 50% (or more) further apart than would be required for either a prior art chemical oxidation or biological treatment alone. One advantage of the present invention is that fewer injection points would be needed for a given site, resulting in lower costs. Optionally, prior to installation and during treatment, one can measure and record any or all of the following: baseline temperature, concentrations of contaminants, organic vapor, sulfate, iron, dissolved oxygen, pH, lower explosive limit and numbers of bacteria in groundwater and/or soil at injection points, monitoring points and sensitive receptors. As is known in the art, sensitive receptors are any place where a person or the environment may be exposed to a contaminant. Monitoring points are usually determined by government regulatory requirements as well as site-specific conditions.

2. If the sustainable rate at which the injection points can accept liquid is not otherwise known, prior to oxidation treatment, determine the rate that water is accepted at each injection point, and estimate a maximum rate that can be sustained by the injection point. This injection point capacity is estimated by introducing water or nutrient enriched water into the injection point. By varying the injection rate and monitoring the liquid level at and near the injection point, estimation of the sustainable rate of injection is made. The rate at which the liquid level in the well stabilizes (does not substantially increase or decrease in elevation) is the estimated injection point capacity. If the injection point capacity is not estimated, the subsequent injection steps will require more monitoring. For the purposes of presenting the preferred embodiment, the estimated injection point capacity is assumed to have been calculated.

3. Initially inject a hydrogen peroxide solution (said solution having a concentration of 5 to 10 percent hydrogen peroxide in water) at a rate of 5% to 40%, preferably between 10% and 30%, of the estimated injection point capacity, for up to 15 minutes. The preferred method of diluting the hydrogen peroxide from the commercially available concentration (35 or 50%) is through the use of nutrient enriched water. Monitor temperature change and liquid level in the injection point for 15 minutes or more as required to maintain the following criteria: (a) liquid levels should be consistently decreasing; and (b) temperature at the injection point should be below 40° C. and not rise at a rate of more than 1° C. every 5 minutes. Foaming in the injection point should be observed to be minimal. Monitoring parameters at wells and sensitive receptors should be at levels not considered unusual or dangerous for the characteristics of the particular site and contaminants.

4. Proceed to inject the remaining oxidant earmarked for this injection event. Injection rates should be maintained at less than 50% of the injection point capacity. In some instances it will be convenient to iteratively cycle between a series of injection points to reduce the total time necessary to apply the oxidant to all of the planned injection points. During this phase of the injection process, hydrogen peroxide concentrations can be increased slowly from an initial concentration of 5 to 10% to up to a concentration of 20% provided that: (a) injection point temperature is maintained at less than 40° C.; (b) observations of injection point foaming and liquid levels support continued injection; and (c) safe conditions are maintained at all sensitive receptors. The total quantity of hydrogen peroxide injected will vary based upon soil and groundwater conditions and the nature and distribution of the contaminant being treated. Typically a total of 5 to 30 kg of hydrogen peroxide (at a nominal concentration of 35%) per pound of contaminant to be treated will be diluted and injected during the iterative process detailed herein. The total quantity of hydrogen peroxide utilized in the method of the present invention typically will be significantly less than that which would be used during chemical oxidation alone.

5. During each injection event, once between 60% to 80%, preferably between 66% and 75%, of the hydrogen peroxide intended for the injection event has been applied, the injection rate should then be increased to 75% or more of the estimated injection point capacity. Hydrogen peroxide concentration should be increased to a maximum of 35%. The goal at this stage is to increase the temperature in and around the immediate vicinity of the injection point to greater than 30° C. but less than 60° C. between 30 minutes and 90 minutes, preferably for at least 1 hour. Careful monitoring of the injection point and sensitive receptors is recommended. An empirical understanding for the reaction of the various monitoring points based upon experience to date with the injection process at the particular treatment location is valuable.

6. With the increased temperature, the chemical oxidation reaction should become less efficient at contaminant destruction and oxygen generation should be observed. During this period, microbial population modification occurs. Oxygen generation also provides for subsequent microbial activity. Water is introduced into the injection wells to mediate the chemical oxidation reaction, as needed. The preferred method involves introduction of nutrient enriched water.

7. The injection event is terminated when any of the following occurs: (a) all intended hydrogen peroxide has been injected; (b) the injection point capacity is reached; or (c) the injection point temperature is sustained between 50° C. and 70° C., preferably above 60° C. Monitoring at injection points, sensitive receptors and other selected monitoring points should continue.

8. Optionally, once injection point temperature is less than 45° C., preferably below 40° C. and hydrogen peroxide concentrations in groundwater have reduced to below 1,000 parts per million, bacteria cultured to degrade the contaminants being treated can be introduced into the injection points or other proximal locations while fresh water flushing continues, preferably using nutrient enriched water. The cultured bacteria are commercially available and are typically required at a site of a recent release of contaminants, as is known in the art. If the contaminants have been in place for a long period of time (usually 2 years or more) then introduction of cultured bacteria may not be required. Bacterial nutrients such as nitrogen, phosphorous and potassium should be added before, along with or after bacteria introduction as needed to promote bacterial growth. The preferred method of adding the nutrients is continuously throughout the entire remedial additive injection process with the introduction of water, either via injection or flushing. Alternatively, water may be flushed into the injection wells after the bacteria and bacterial nutrients are introduced. Once the bacteria and/or bacterial nutrients have been flushed through the injection point by 1 to 5 injection point volumes of water, water injection can be terminated.

9. If injection point temperature again increases above 40° C. water injection could be resumed to reduce the injection point temperature. The injection event is complete once the injection point temperature is consistently decreasing and monitoring parameters at all locations are stable at safe levels for an acceptable period of time (typically 2 hours or more).

10. Injection events should be repeated as needed. Preferably, multiple injection events should occur at intervals of at least 2 days, with a week-long interval being optimal. Typically, three to seven injection events are required to reach remedial goals, often less than by using either a chemical oxidation or biological treatment. Monitoring of the various parameters mentioned herein at injection points, monitoring points and sensitive receptors is typically conducted between injection events.

As shown in Table 2, the method of the invention has a substantial positive impact on the numbers of certain known types of microorganisms. Of these certain known types of microorganisms, a portion are known to beneficially degrade a wide variety of contaminants and are therefore desirable. Increasing the population of these microorganisms is known to degrade contaminants and significantly improve the efficiency soil and groundwater remediation.

TABLE 2

Positive Impact of the Invention on Microbial Abundance in Groundwater

| Monitoring Well | Pre-treatment Microbial Abundance | Post-treatment Microbial Abundance |
| --- | --- | --- |
| LEI-30D | 470 | 34,000,000 |
| LEI-31S | 670 | 13,000,000 |
| LEI-31D | 415 | 15,000,000 |

Note:
Units are Colony Forming Units per milliliter (CFU/mL) as measured by heterotrophic plate count.

The method of the present invention can be used to remediate a wide variety of contaminants. An example of the reduction in contaminant concentrations associated with the use of the invention is presented in Table 3. It is notable that, in this example, the process remediates not only petroleum hydrocarbons such as gasoline, but also methyl tertiary butyl ether (MTBE) which is a synthetic additive to gasoline used for multiple purposes. MTBE has been found to be a pervasive contaminant in groundwater.

TABLE 3

Reduction in Gasoline Constituents during use of the Invention.

| Gasoline Constituent/ Monitoring Well | Pre-Treatment | Post-Treatment |
| --- | --- | --- |
| Well A | | |
| Gasoline Hydrocarbons | 15,900 | 476 |
| MTBE | 2,300 | 33 |
| Well B | | |
| Gasoline Hydrocarbons | 9,610 | 110 |
| MTBE | 26,200 | 5 |

Note:
Units are micrograms per Liter (µg/L, approximately parts per billion).

While certain novel features of the present invention have been shown and described, it will be understood that various omissions, substitutions and changes in the forms and details of the device illustrated and in its operation can be made by those skilled in the art without departing from the spirit of the invention.

I claim:

1. A method for the remediation of contaminated soil or groundwater at a pre-evaluated site, said method comprising the following steps:
   determining an appropriate quantity of hydrogen peroxide to be used, an appropriate number of injection point wells necessary for remediation, and an appropriate amount of bacteria to be introduced at the site;
   installing a plurality of injection points at the site;
   establishing a maximum acceptance rate of water for each injection point;
   introducing a hydrogen peroxide solution at each injection point;
   maintaining the temperature in each injection point below 40° C.;
   maintaining a rate of temperature increase in each injection point below 1° C. change for every 5 minutes;
   maintaining a liquid level in each injection point which is consistently decreasing;
   increasing the rate of introduction of the hydrogen peroxide solution to maintain the injection point temperature below 40° C., until the amount of hydrogen peroxide used is between 60 per cent and 80 per cent of the amount determined to be used for the site;
   once the amount of hydrogen peroxide introduced into the injection points is between 60 per cent and 80 per cent of the amount determined to be used for the site, increase the rate of introduction of the hydrogen peroxide solution to at least 75 per cent of the established maximum acceptance rate for each injection point, maintaining the temperature at and around each injection point between 25° C. and 70° C. for between 30 and 90 minutes;
   terminating the introduction of hydrogen peroxide into the injection points when one of the following conditions occurs: (a) all of the hydrogen peroxide is used up; (b) injection point capacity is reached; or (c) injection point temperature is sustained between 50° C. and 70° C.;
   flushing each of the injection points with water to reduce the temperature at each injection point below 45° C.;
   introduction of bacterial nutrients into at least one of the injection points; and
   flushing the at least one of the injection points with water to distribute the bacterial nutrients.
2. The method of claim 1, further comprising:
   introduction of bacteria into at least one of the injection points after the step of flushing each of the injection points with water to reduce the temperature at each injection point below 45° C.
3. The method of claim 1, where the liquid level of each injection well is maintained by adjusting the rate of introduction of hydrogen peroxide solution into the injection well.
4. The method of claim 1, where the liquid level of each injection well is maintained by adjusting the rate of introduction of water into the injection well.
5. The method of claim 1, where the temperature at each injection point is maintained by the introduction of water.
6. The method of claim 1, where the rate of change of the temperature at each injection point is maintained by the introduction of water.
7. The method of claim 1, where the hydrogen peroxide solution introduced into the injection points comprises nutrient enriched water.
8. The method of claim 1, where the water used to flush the injection points is nutrient enriched water.
9. The method of claim 1, further comprising:
   repeating the steps of the method over a period of several days, where an interval of at least 1 day separates each repetition.
10. The method of claim 1, further comprising:
   repeating the steps of the method over a period of several days, where an interval of at least 1 week separates each repetition.
11. The method of claim 1, further comprising the step of:
   prior to introducing the hydrogen peroxide solution into each injection point, measuring at least one of the following conditions at a plurality of locations at the site: baseline temperature, contaminant concentration, organic vapor, sulfate, iron, dissolved oxygen, pH, percent of the lower explosive limit, and existing bacteria concentration.
12. The method of claim 1, where the rate of introduction of the hydrogen peroxide solution into each injection point is between 5 per cent and 40 per cent of the established maximum acceptance rate for each injection point.
13. The method of claim 1, where the temperature at and around each injection point is sustained between 30° C. and 60° C. when the rate of introduction of the hydrogen peroxide solution into each injection point is at least 75 per cent of the established maximum acceptance rate for each injection point.
14. The method of claim 1, where the hydrogen peroxide solution is diluted with water.
15. The method of claim 14, where the water used to dilute the hydrogen peroxide solution is nutrient enriched water.

* * * * *